United States Patent
MacNeill

(10) Patent No.: US 12,405,253 B2
(45) Date of Patent: Sep. 2, 2025

(54) METHODS AND SYSTEMS FOR HYDROPHILIC-PHASE EXTRACTION

(71) Applicant: Laboratory Corporation of America Holdings, Burlington, NC (US)

(72) Inventor: Robert MacNeill, Monroe Township, NJ (US)

(73) Assignee: Laboratory Corporation of America Holdings, Burlington, NC (US)

( * ) Notice: Subject to any disclaimer, the term of this patent is extended or adjusted under 35 U.S.C. 154(b) by 335 days.

(21) Appl. No.: 18/148,839

(22) Filed: Dec. 30, 2022

(65) Prior Publication Data

US 2023/0213490 A1 Jul. 6, 2023

Related U.S. Application Data

(60) Provisional application No. 63/295,585, filed on Dec. 31, 2021.

(51) Int. Cl.
| | |
|---|---|
| *G01N 30/72* | (2006.01) |
| *B01D 15/30* | (2006.01) |
| *B01D 15/42* | (2006.01) |
| *G01N 30/00* | (2006.01) |
| *G01N 30/14* | (2006.01) |

(Continued)

(52) U.S. Cl.
CPC ....... *G01N 30/7233* (2013.01); *B01D 15/305* (2013.01); *B01D 15/424* (2013.01); *G01N 30/14* (2013.01); *G01N 30/88* (2013.01); *G01N 2030/009* (2013.01); *G01N 2030/027* (2013.01); *G01N 2030/8827* (2013.01)

(58) Field of Classification Search
CPC .... G01N 30/7233; G01N 30/14; G01N 30/88; G01N 2030/009; G01N 2030/027; G01N 2030/8827; G01N 30/06; B01D 15/305; B01D 15/424
See application file for complete search history.

(56) References Cited

U.S. PATENT DOCUMENTS

| | | | | |
|---|---|---|---|---|
| 2010/0237235 | A1* | 9/2010 | Ozbal | G01N 30/7266 |
| | | | | 250/288 |
| 2020/0284801 | A1* | 9/2020 | Beutel | C09K 11/06 |
| 2020/0393423 | A1* | 12/2020 | MacNeill | G01N 30/02 |

FOREIGN PATENT DOCUMENTS

| | | | |
|---|---|---|---|
| CN | 106691937 A | 5/2017 | |
| CN | 108872447 A | * 11/2018 | ............ G01N 30/02 |
| CN | 110208401 B | 11/2021 | |

OTHER PUBLICATIONS

Ya-Li Bai, Bao-Dong Cai, Xiao-Tong Luo, Tian-Tian Ye, and Yu-Qi Feng Journal of Agricultural and Food Chemistry 2018 66 (41), 10906-10912 DOI: 10.1021/acs.jafc.8b03820 (Year: 2018).*

(Continued)

*Primary Examiner* — Timothy P Graves
(74) *Attorney, Agent, or Firm* — Kilpatrick Townsend & Stockton LLP

(57) ABSTRACT

Disclosed herein are embodiments of methods for oligonucleotide analysis using a novel solid-phase extraction and hydrophilic-interaction liquid chromatography. The unique polar-based retention methods provided herein provide a high-recovery extraction. The methods improve assay reliability and reproducibility and reach picomolar sensitivity with the demonstrably beneficial accurate mass platform. Also disclosed herein are systems and computer program products for performing these methods.

19 Claims, 4 Drawing Sheets

(51) Int. Cl.
*G01N 30/88* (2006.01)
*G01N 30/02* (2006.01)

(56) References Cited

OTHER PUBLICATIONS

Anand, P. et al., "Novel hydrophilic-phase extraction, HILIC and high-resolution MS quantification of an RNA oligonucleotide in plasma," Bioanalysis 14:47-62 (2022).
MacNeill, R. et al., "An oligonucleotide bioanalytical LC-SRM methodology entirely liberated from ion-pairing," Bioanalysis 11:1155-67 (2019).
PCT/US2022/054372, "International Preliminary Report on Patentability", dated Jul. 11, 2024, 10 pages.
PCT/US2022/054372, "International Search Report and Written Opinion", dated Apr. 5, 2023, 14 pages.

* cited by examiner

METHODS AND SYSTEMS FOR HYDROPHILIC-PHASE EXTRACTION

CROSS-REFERENCE TO RELATED APPLICATION

This application claims priority to U.S. Provisional Patent Application Ser. No. 63/295,585 filed Dec. 31, 2021, and titled "Methods And Systems For Ion-Pairing Free Hydrophilic Phase Extraction," the entirety of which is incorporated herein by reference.

TECHNICAL FIELD

The present disclosure relates generally to bioanalytical separation techniques and, more particularly, although not exclusively, to methods and systems for hydrophilic-phase extraction.

BACKGROUND

In the field of oligonucleotide bioanalysis, there are many challenges when it comes to any quantitative platform, not limited to LC-MS. The selected means of biological sample preparation and extraction feeds and impacts directly into the performance endpoint of the analytical platform used. Principally, challenges may arise from the difficulties that accompany the use of ion-pairing reagents and/or from using established means of extraction traditionally designed for hydrophobic small molecules rather than polar and ionic biologics. Thus, novel methods and systems for analyses employing hydrophilic-phase extractions are provided herein.

SUMMARY

Disclosed herein are embodiments of methods for oligonucleotide analysis using a solid-phase extraction and a hydrophilic-interaction liquid chromatography method.

In some embodiments, a method for determining an amount and/or presence of a compound of interest includes (i) providing a sample believed to contain the compound of interest (ii) conducting an extraction of the compound of interest, wherein the extraction is a hydrophilic-phase extraction (iii) isolating the compound of interest from other components of the sample via liquid chromatography, and (iv) analyzing the compound of interest via a mass spectrometer.

Also described herein are systems for performing the methods disclosed. In some embodiments, a system for determining an amount and/or a presence of a compound of interest in a sample from a subject may include a solid-phase extraction system, a liquid chromatography system, and a mass spectrometry detection system.

Also described herein are computer-program products which, when executed on one or more data processors, may cause one or more data processors to perform actions to direct at least one of the steps of providing a sample believed to contain a compound of interest, conducting a solid-phase extraction of the compound of interest from a biological matrix, isolating the compound of interest from other components of the sample via liquid chromatography, and analyzing the compound of interest via a mass spectrometer.

DETAILED DESCRIPTION OF THE INVENTION

Figure 1:
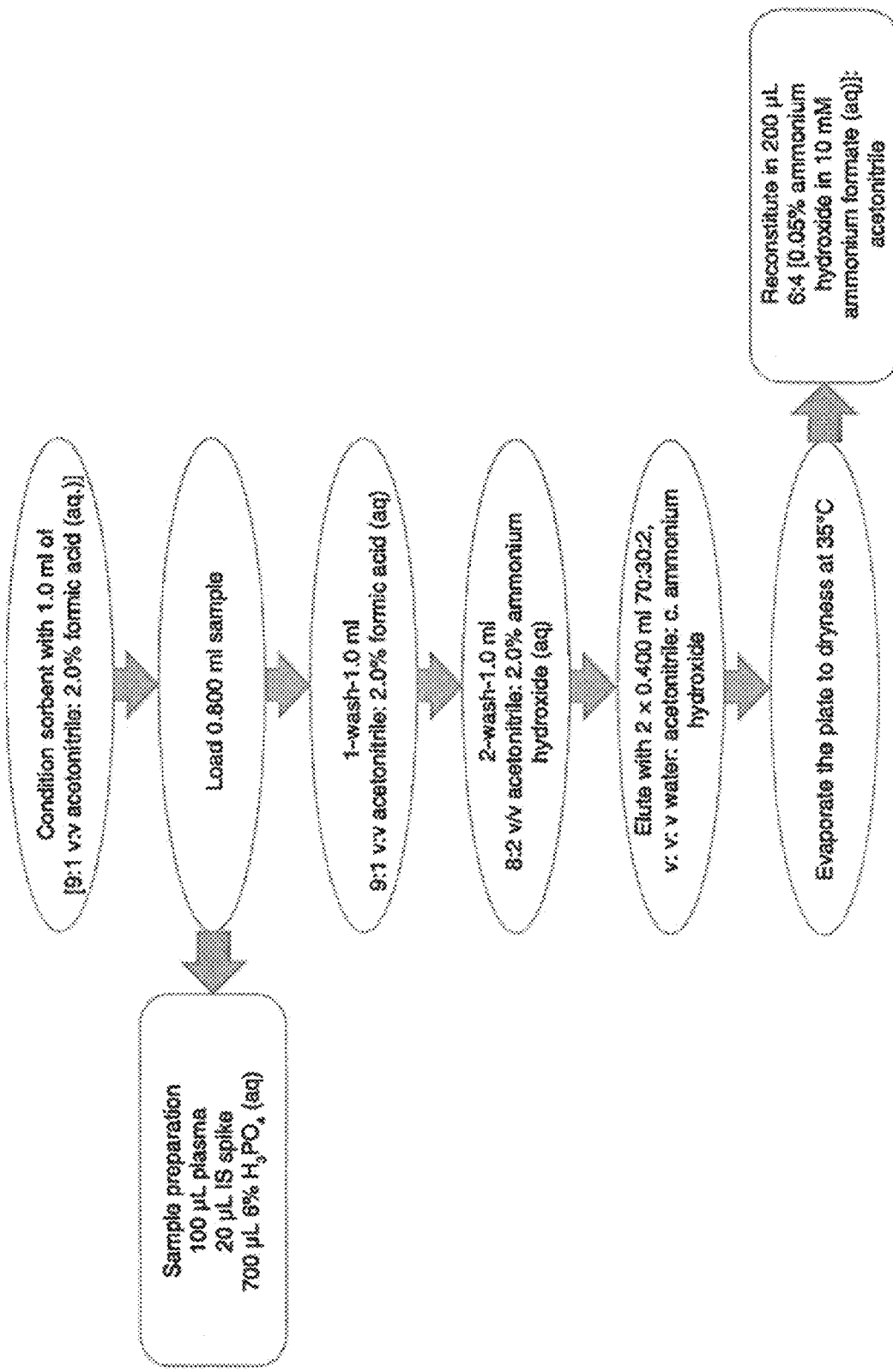
FIG. 1 depicts a flow chart for sample preparation and hydrophilic-phase extraction in accordance with an embodiment of the present disclosure.

The following description recites various aspects and embodiments of the present methods and systems. No particular embodiment is intended to define the scope of the methods and systems. Rather, the embodiments merely provide non-limiting examples of various methods and systems that are at least included within the scope of the methods and systems. The description is to be read from the perspective of one of ordinary skill in the art; therefore, information well known to the skilled artisan is not necessarily included.

Definitions

The present disclosure now will be described more fully hereinafter. The disclosure may be embodied in many different forms and should not be construed as limited to the aspects set forth herein; rather, these aspects are provided so that this disclosure will satisfy applicable legal requirements. Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

Illustrative examples are given to introduce the reader to the general subject matter discussed herein and are not intended to limit the scope of the disclosed concepts. Figure descriptions in the detailed description describe various additional features and examples with reference to the drawings in which like numerals indicate like elements, and directional descriptions are used to describe the illustrative aspects, but, like the illustrative aspects, should not be used to limit the present disclosure.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

Various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Embodiments of the present invention may be used to analyze a sample or biological sample. The sample may be in liquid, solid, and/or semi-solid form. The biological sample may include tissue, blood, biofluids, biosolids and the like as well as combinations thereof. Thus, the term "biological sample" includes, by way of example and without limitation, whole blood, plasma or serum, urine, cerebral spinal fluid (CSF), lymph samples, saliva, sputum, stool samples, lavages, semen, tissues, and/or body fluids and chemical constituents thereof in raw form and/or in preparations.

As used herein, the terms "compound of interest," "component of interest," or "biomarker of interest" is any marker that may provide biological information about the physiological state of an organism. In certain embodiments, the presence or absence of the biomarker may be informative. In other embodiments, the level of the biomarker may be informative. In an embodiment, the component of interest may include an oligonucleotide(s). The oligonucleotides may be therapeutics.

As used herein, the terms "subject" and "individual" may be used interchangeably. A subject may comprise an animal. Thus, in some embodiments, the sample is obtained from a mammalian animal, including, but not limited to a dog, a cat, a horse, a rat, a monkey, and the like. In some embodiments, the sample is obtained from a human subject. In some embodiments, the subject is a patient, that is, a living person presenting themselves in a clinical setting for diagnosis, prognosis, or treatment of a disease or condition.

As used herein, the terms "purify," "separate," "extract," or derivations thereof do not necessarily refer to the removal of all materials other than the analyte(s) of interest from a sample matrix. Instead, in some embodiments, the terms "purify," "separate," or "extract" refer to a procedure that enriches the amount of one or more analytes of interest relative to one or more other components present in the sample matrix. In some embodiments, a "purification," a "separation," and/or an "extraction" procedure can be used to remove one or more components of a sample that could interfere with the detection of the biomarker of interest, for example, one or more components that could interfere with detection of an analyte by mass spectrometry.

As used herein, "chromatography" refers to a process in which a chemical mixture carried by a liquid or gas is separated into components as a result of differential distribution of the chemical entities as they flow around or over a stationary liquid or solid phase.

As used herein, "liquid chromatography" (LC) means a process of selective retardation of one or more components of a fluid solution as the fluid percolates through a column of a finely divided substance, or through capillary passageways. The retardation results from the distribution of the components of the mixture between one or more stationary phases and the bulk fluid, (i.e., mobile phase), as this fluid moves relative to the stationary phase(s). "Liquid chromatography" includes reverse phase liquid chromatography (RPLC), high performance liquid chromatography (HPLC) and hydrophilic-interaction liquid chromatography (HILIC). HILIC is a potent chromatographic mode involving the combination of electrostatic interactions and partitioning between a water-enriched layer adsorbed to a polar stationary phase and a high-acetonitrile mobile phase, and where retention generally increases with analyte polarity.

As used herein, the term "analytical column" refers to a chromatography column having sufficient chromatographic plates to affect a separation of the components of a test sample matrix. Preferably, the components eluted from the analytical column are separated in such a way to allow the presence or amount of an analyte(s) of interest to be determined. In some embodiments, the analytical column comprises particles having an average diameter of about 5 µm. In some embodiments, the analytical column is a functionalized silica or polymer-silica hybrid, or a polymeric particle or monolithic silica stationary phase, such as a phenyl-hexyl functionalized analytical column.

As used herein, "ion-pairing reagents" are chemical additives salts that will bind electrostatically to solutes or analytes being chromatographed or subjected to other analytical processes according to the nominal chemistry of the ion-pair complex, thus allowing the manifestation of certain chromatographic modes. Examples of ion-pairing reagents include alkylsulfonates and alkylammonium salts.

Analytical columns can be distinguished from "extraction columns," or "extraction plates" of a typical 96-well format, which typically are used to separate or extract retained materials from non-retained materials to obtain a "purified" sample from a matrix starting point to a significantly cleaner extracted endpoint for further purification or analysis. Oligonucleotide therapeutics may be short-chain DNA or RNA oligomers designed to interfere with the expression of disease-related protein. The sequences of the oligomers may be approximately 15 to 50 nucleotide units.

As used herein, the terms "mass spectrometry" or "MS" generally refer to methods of filtering, detecting, and measuring ions based on their mass-to-charge ratio, or "m/z." In MS techniques, one or more molecules of interest are ionized, and the ions are subsequently introduced into a mass spectrometer where, due to a combination of electric fields, the ions follow a path in space that is dependent upon mass ("m") and charge ("z").

In certain embodiments, the mass spectrometer uses a "quadrupole" system. In a "quadrupole" or "quadrupole ion trap" mass spectrometer, ions in an oscillating radio frequency (RF) field experience a force proportional to the direct current (DC) potential applied between electrodes, the amplitude of the RF signal, and m/z. The voltage and amplitude can be selected so that only ions having a particular m/z travel the length of the quadrupole, while all other ions are deflected. Thus, quadrupole instruments can act as both a "mass filter" and as a "mass detector" for the ions injected into the instrument.

In certain embodiments, "tandem mass spectrometry" (MS/MS) is used. Tandem mass spectrometry (MS/MS) is the name given to a group of mass spectrometric methods wherein "parent or precursor" ions generated from a sample are fragmented to yield one or more "fragment or product" ions, which are subsequently mass analyzed by a second MS procedure. MS/MS methods are useful for the analysis of complex mixtures, especially biological samples, in part because the selectivity of MS/MS can minimize the need for extensive sample clean-up prior to analysis. In an example of an MS/MS method, precursor ions are generated from a sample and passed through a first mass filter (quadrupole 1 or Q1) to select those ions having a particular mass-to-charge ratio. These ions are then fragmented, typically by collisions with neutral gas molecules in the second quadrupole (Q2), to yield product (fragment) ions which are selected in the third quadrupole (Q3), the mass spectrum of which is recorded by an electron multiplier detector. The product ion spectra so produced are indicative of the structure of the precursor ion, and the two stages of mass filtering can eliminate ions from interfering species present in the conventional mass spectrum of a complex mixture.

The term "ionization" and "ionizing" as used herein refers to the process of generating an analyte ion having a net electrical charge equal to one or more electron units. Negative ions are those ions having a net negative charge of one or more electron units, while positive ions are those ions having a net positive charge of one or more electron units.

The term "electron ionization" as used herein refers to methods in which an analyte of interest in a gaseous or vapor phase interacts with a flow of electrons. Impact of the electrons with the analyte produces analyte ions, which may then be subjected to a mass spectrometry technique. The term "chemical ionization" as used herein refers to methods in which a reagent gas (e.g. ammonia) is subjected to electron impact, and analyte ions are formed by the interaction of reagent gas ions and analyte molecules.

The term "electrospray ionization," or "ESI," as used herein refers to methods in which a solution is passed along a short length of capillary tube, to the end of which is applied a high positive or negative electric potential. Upon reaching the end of the tube, the solution may be vaporized (nebulized) into a jet or spray of very small droplets of solution in solvent vapor. This mist of droplet can flow through an evaporation chamber which is heated slightly to prevent condensation and to evaporate solvent. As the droplets get smaller the electrical surface charge density increases until such time that the natural repulsion between like charges causes ions as well as neutral molecules to be released.

The term "Atmospheric Pressure Chemical Ionization," or "APCI," refers to mass spectroscopy methods that are similar to ESI, however, APCI produces ions by ion-molecule reactions that occur within a plasma at atmospheric pressure. The plasma is maintained by an electric discharge between the spray capillary and a counter electrode. Then, ions are typically extracted into a mass analyzer by use of a set of differentially pumped skimmer stages. A counterflow of dry and preheated $N_2$ gas may be used to improve removal of solvent. The gas-phase ionization in APCI can be more effective than ESI for analyzing less-polar species.

The term "Atmospheric Pressure Photoionization" ("APPI") refers to the form of mass spectroscopy where the mechanism for the photoionization of molecule M is photon absorption and electron ejection to form the molecular M+. Because the photon energy typically is just above the ionization potential, the molecular ion is less susceptible to dissociation. In many cases it may be possible to analyze samples without the need for chromatography, thus saving significant time and expense. In the presence of water vapor or protic solvents, the molecular ion can extract H to form MH+. This tends to occur if M has a high proton affinity. This does not affect quantitation accuracy because the sum of M+ and MH+ is constant. Drug compounds in protic solvents are usually observed as MH+, whereas nonpolar compounds such as naphthalene or testosterone usually form M+.

Methods

Disclosed herein are embodiments of methods for oligonucleotide analysis using a novel solid-phase extraction and a hydrophilic-interaction liquid chromatography method. Because of the polar nature of some oligonucleotides, purifying oligonucleotides by reverse-phase chromatography can be extremely difficult. Subsequently, such polar entities may typically be accompanied by ion-pairing agents when purifying by reverse-phase chromatography such that polar oligonucleotides may have increased retention times, leading to increased separation resolution. Consequently, ion-pairing conditions have yielded excessive instrumental down time, reduced column lifetimes, system dedication to ion-pairing methods, high risk of signal drift, and general loss of sensitivity in said dedicated systems.

Recently, efforts have been made to create quantitative bioanalytical approaches for oligonucleotides without the use of ion-pairing reagents, having a particular focus on hydrophilic-interaction chromatography (HILIC) preceded by polymeric-based weak cation exchange (WAX) solid-phase extraction (SPE). Extraction and chromatography are two elements of such a method useful prior to mass spectral detection. In this context, a bioanalytical separation method for oligonucleotides was developed, wherein a novel and distinct extraction step is demonstrated to be the highlight of this methodology. The focus in this methodology is on a unique, polar-based retention scheme to produce a high-recovery extraction, presenting a high-performance alternative extraction means, and further to involve hydrophilic-interaction liquid chromatography and contemporary high-resolution MS as the end point. Disclosed herein are methods for bioanalysis of oligonucleotides utilizing a novel hydrophilic means of solid-phase extraction with robust high-recovery and pair-free methodology, reaching picomolar (pM) sensitivity with all methodological elements combined.

Many embodiments of the present disclosure may include the general steps of performing a solid-phase extraction, chromatographically isolating the component of interest, and performing mass spectral analysis on the component of interest. In some embodiments, a method for determining an amount and/or presence of a compound of interest includes (i) providing a sample believed to contain the compound of interest (ii) conducting an extraction of the compound of interest, wherein the extraction is a hydrophilic-phase extraction (iii) isolating the compound of interest from other components of the sample via liquid chromatography, and (iv) analyzing the compound of interest via mass spectral analysis. In some embodiments, the sample is a biological sample, and the biological sample may be plasma. In some embodiments, the compound of interest may be an oligonucleotide or oligonucleotides and may be an RNA or DNA oligonucleotide. In some embodiments, the oligonucleotides may be a therapeutic oligonucleotide. In some embodiments, the compound of interest may be an oligonucleotide therapeutic. In some embodiments, the method may generally be conducted under ion-pairing free conditions. In some embodiments, the solid-phase extraction may be a hydrophilic-phase extraction conducted on a modified sorbent bed including an aminopropyl phase on silica base. In some embodiments, an RNA oligonucleotide may be the compound of interest due to its high polarity. In some embodiments, a DNA oligonucleotide may be the compound of interest. In some embodiments, RNA oligonucleotides may be more polar than DNA oligonucleotides as evidenced by an extra hydroxylation of the ribose ring.

In some embodiments, during the step of performing an extraction, conditions akin to a solid-phase extraction (SPE) may be used. The sorbent bed for the extraction may vary but may include an aminopropyl phase on a silica base in a 96-well format. In one embodiment, the collection plate for the extraction is a polypropylene plate. In some embodiments, the extraction may be performed by and allowed to elute by gravity, obtaining a slow, linear flow velocity conducive to forming and breaking high-energy ionic interactions depending on the biosample being analyzed. In some embodiments, the sorbent bed may be conditioned with an experimental mixture of acetonitrile and formic acid. In one embodiment, the sorbent bed is conditioned with a mixture of 9:1, v:v, acetonitrile:2% formic acid (aqueous) liquid. In some embodiments, an equilibration step is not performed on the sorbent bed prior to sample loading.

In some embodiments, prior to loading the biosample onto the sorbent bed, the biosample may be conditioned or diluted with various solvents. In some embodiments, the biosample may be plasma containing an RNA oligonucleotide where the sample is diluted with an internal standard and an aqueous acid. In one embodiment of the present disclosure, 100 µl of plasma is diluted with 700 µl of 6% aqueous phosphoric acid and 20 µl of 2500 nM internal standard in 9:1, v:v, acetonitrile:water. Following a unique one-step conditioning of the sorbent bed with 1 mL 9:1 v:v acetonitrile: [2% formic acid (aq)] and the aforementioned preparation of biosample, the biosample may be loaded onto the sorbent bed followed by subsequent washes. In some embodiments, the washes may include a mixture of organic and aqueous liquids. In one embodiments, the sorbent bed is washed with 1 ml of 9:1, v:v, acetonitrile:2% formic acid (aqueous). The sorbent bed with the loaded sample is subsequently washed with 1 ml of 8:2, v:v, acetonitrile:2% ammonium hydroxide (aqueous). In other embodiments, alternate wash compositions may be used, and more, or less, washes may be performed experimentally. Analyte elution may be affected by a final application of a polar wash. In one embodiment using an RNA oligonucleotide as the compound of interest, the oligonucleotide may eluted onto a 1 ml, round-well, 96-well collection plate by two consecutive applications of 400 µl of 2% ammonium hydroxide in 70:30, v:v water:acetonitrile. Eluates may be evaporated to dryness at 30-45° C. using nitrogen gas prior to being resuspended for chromatography. In one example of the extraction step, prior to injecting the biosample into a chromatography system, the resuspension vehicle may include high-grade solvent mixtures.

In some embodiments, following the extraction step, the method of analyzing oligonucleotides may involve chromatographically isolating the compound of interest further. In some embodiments, the method for chromatographic separation may involve liquid chromatography including an analytical column. The method may include experimentally adjusting the composition of the mobile phase. In some embodiments, the method may include experimentally adjusting the composition of the gradient to be use. In some embodiments, an isocratic mixture may be utilized following the extraction step. In one embodiment, the composition of the mobile phase may be a mixture of organic and aqueous liquid.

In some embodiments, an extracted and isolated compound of interest may be analyzed by a mass detecting system. In some embodiments, the analyzing step may involve ionizing the compound of interest and monitoring for a parent peak and/or fragmented ions to provide for evidence of the compound of interest. In some embodiments, analyzing the compound of interest may involve ionizing and monitoring parent ions and fragmented ions in negative-ion mode.

Systems

Also described are systems for performing the methods disclosed herein. In some embodiments, a system for determining an amount and/or a presence of a compound of interest in a sample from a subject may include a solid-phase extraction system, a liquid chromatography system, and a mass spectrometry detection system. In some embodiments, the sample may be a biological sample. Further, the biological sample may be plasma. In some embodiments, the compound of interest may be an oligonucleotide or oligonucleotides. In some embodiments, the oligonucleotides may be therapeutic oligonucleotides.

In some embodiments, the system including the solid-phase extraction system may vary in sorbent bed composition but may generally include a modified sorbent bed including an aminopropyl phase on a silica base. Thus, the solid-phase extraction system may be considered a hydrophilic-phase extraction system. In many embodiments, the system including the solid-phase extraction system, the liquid chromatography system, and the mass spectrometry detection system may include and be used with ion-pairing-free reagents. The mass spectrometry detection system may be a low-resolution or a high-resolution mass spectrometer.

In one embodiment, a computer-program product, when executed on one or more data processors, may cause one or more data processors to perform actions to direct at least one of the steps of providing a sample believed to contain a compound of interest, conducting a solid-phase extraction of the compound of interest, isolating the compound of interest from other components of the sample via liquid chromatography, and analyzing the compound of interest via a mass spectrometer.

Some embodiments of the present disclosure may include analyzing the compound of interest via LC-MS following the step of hydrophilic-phase extraction. In some embodiments, an LC-MS system may include a station for chromatographically isolating the compound of interest from other compounds in the sample and a station for providing mass spectral analysis by nominal and accurate mass detection. In some embodiments, following the extraction step, the compound of interest, being resuspended in a previously determine volume, may be placed into an autosampler of a chromatography system. The autosampler may be configured to inject an amount of the sample into the liquid chromatography system to be separated by an analytical column. In an embodiment, the autosampler may be configured to provide the system with various amounts of sample through various injections at various times. In one embodiment, the liquid chromatography system may be an ultra-performance liquid chromatography (UPLC) system. The UPLC system may include one or more pumps, a degasser, the autosampler, a column heater, and a mobile-phase preheater.

In some embodiments, a liquid chromatography system may use an analytical column. In one embodiment, the analytical column is regular-phase, amide-based chromatography column with dimensions of 2.1×50 mm and 1.7 μm particle diameter. In some embodiments, the column may be an ethylene-bridged hybrid, trifunctionally-bonded amide phase column, although other, regular-phase columns of various compositions and dimensions may be used. An increasing ratio of aqueous to organic gradient may be used in aiding isolation of the compound of interest. Similarly, in one embodiment, the mobile-phase may include components of 0.05% ammonium hydroxide in 10 mM ammonium formate (aqueous) and acetonitrile. A gradient may be generated experimentally. According to one embodiment, the gradient cycle may begin initially at 20% aqueous with an increase to 50% aqueous over the course of five minutes. An isocratic hold for 0.5 minutes may be employed prior to an equilibration step during the final minute of the 6.5-minute period. In other embodiments, a longer period of hold time may be employed for more difficult separations. In other embodiments, the gradient may be altered to begin at a composition lower than 20% aqueous while the terminal composition may be greater than 50% aqueous.

In some embodiments, various flow rates may be utilized according to the liquid chromatography system specifications. In one embodiment, an optimal flow rate of 0.45 ml/minute was used for the mobile phase with an injection of 6.0 μl. The amount injected into the system may correlate to an injection loop size, column size, and flow rate of the mobile phase. A wash may follow re-equilibration of the system. The composition of the mixture for washing may be, according to one embodiment, 0.05% ammonium hydroxide in 10 mM ammonium formate (aqueous). Alternatively, the composition of the wash may be a 1:1 v:v acetonitrile:0.05% ammonium hydroxide in 10 mM ammonium formate (aqueous).

In some embodiments, following chromatographic separation, the liquid chromatography system may be configured to provide the mass spectrometer with a predetermined volume to analyze. In some embodiments, the mass spectrometer may analyze the compound of interest through chemical ionization followed by collision-induced fragmentation. In one embodiment, electrospray ionization (ESI) may be used by the system. In alternate embodiments, atmospheric pressure chemical ionization (APCI) may be used by the system to ionize and fragment the compound of interest. Other ionization modes may be utilized by the system. In one embodiment, the mass spectrometer may be a nominal mass detector (low-resolution mass spectrometer) while in another embodiment, the mass spectrometer may be an accurate mass detector (high-resolution mass spectrometer). The nominal mass detector may include a triple-quadrupole system. In an alternative embodiment, the accurate mass detector may include a time-of-flight, tandem mass spectrometry (TOF-MS/MS) system. Both nominal mass and accurate mass systems may be operated in negative-ion selective mode. In many embodiments, the system may be used with ion-pairing-free reagents.

FIG. 1 depicts a flow chart for sample preparation and hydrophilic-phase extraction in accordance with an embodiment of the present disclosure. In FIG. 1, the sorbent bed is conditioned with a mixture of 9:1, v:v, acetonitrile:2.0% formic acid (aq.). Following biosample dilution and preparation with an aqueous acid and an internal standard, 800 μl of biosample is loaded onto the sorbent bed. The sorbent containing the sample with the compound of interest is subsequently washed with multiple washes, each wash varying in composition. Finally, the compound of interest may be eluted with multiple applications of 400 μl 70:30:2, v:v:v, water:acetonitrile:c. ammonium hydroxide. Following evaporation, the compound of interest is reconstituted in 200 μl of 4:6, v:v, acetonitrile:0.05% ammonium hydroxide in 10 mM ammonium formate (aqueous).

Figure 3:
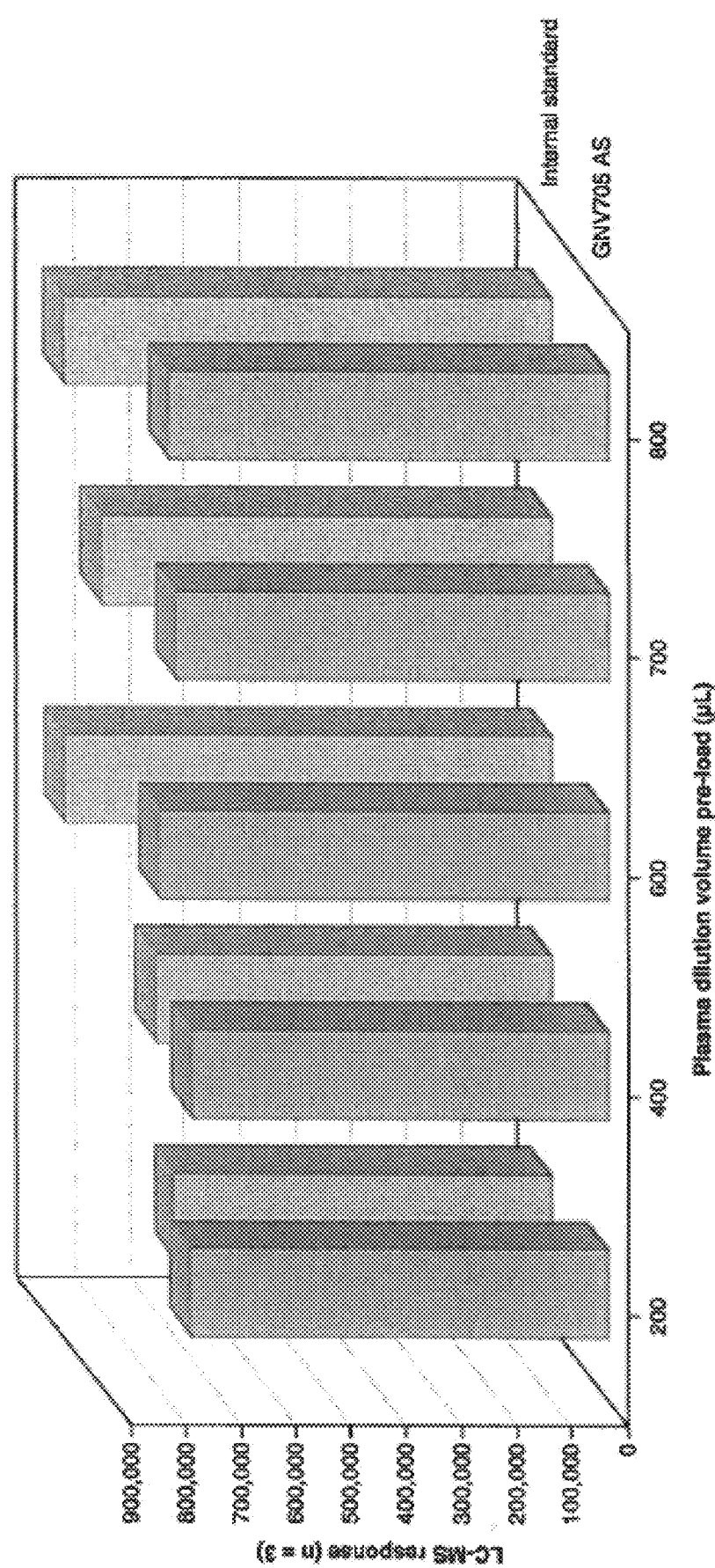
FIG. 3 depicts a three-dimensional bar graph displaying the LC-MS response comparison of analyte GNV705 AS and an internal standard, where an initial 100-µl plasma volume was diluted to different volumes prior to loading, in accordance with an embodiment of the present disclosure.

FIG. 3 depicts a three-dimensional bar graph displaying the LC-MS response comparison of analyte GNV705 AS and an internal standard, where an initial 100-μl plasma volume was diluted to different volumes prior to loading, in accordance with an embodiment of the present disclosure. The bar graph is obtained using LC-MS response of both the internal standard and the compound of interest, GNV705 AS following the hydrophilic-phase extraction and separation. Such a comparison may be determined experimentally. Each of the increasing x-axis volumes are noted as post-dilution volumes of plasma with 6% aqueous acid, including the internal standard. Plasma was diluted at various volumes prior to loading onto the sorbent bed. The dilutions with aqueous acid allow for basic groups on the oligonucleotide to be protonated such that LC-MS response may be affected. Prior to generation of FIG. 3, a dilution test showed around 25% better recovery when diluting with 4% to 6% phosphoric acid in the established conditions. The assay appeared to be optimized with a 700 μl dilution of 6% phosphoric acid. In one embodiment of the disclosure, more than 6% aqueous acid is used to dilute plasma. Further, greater than 700 μl of aqueous acid may be used to dilute the plasma.

Figure 4:
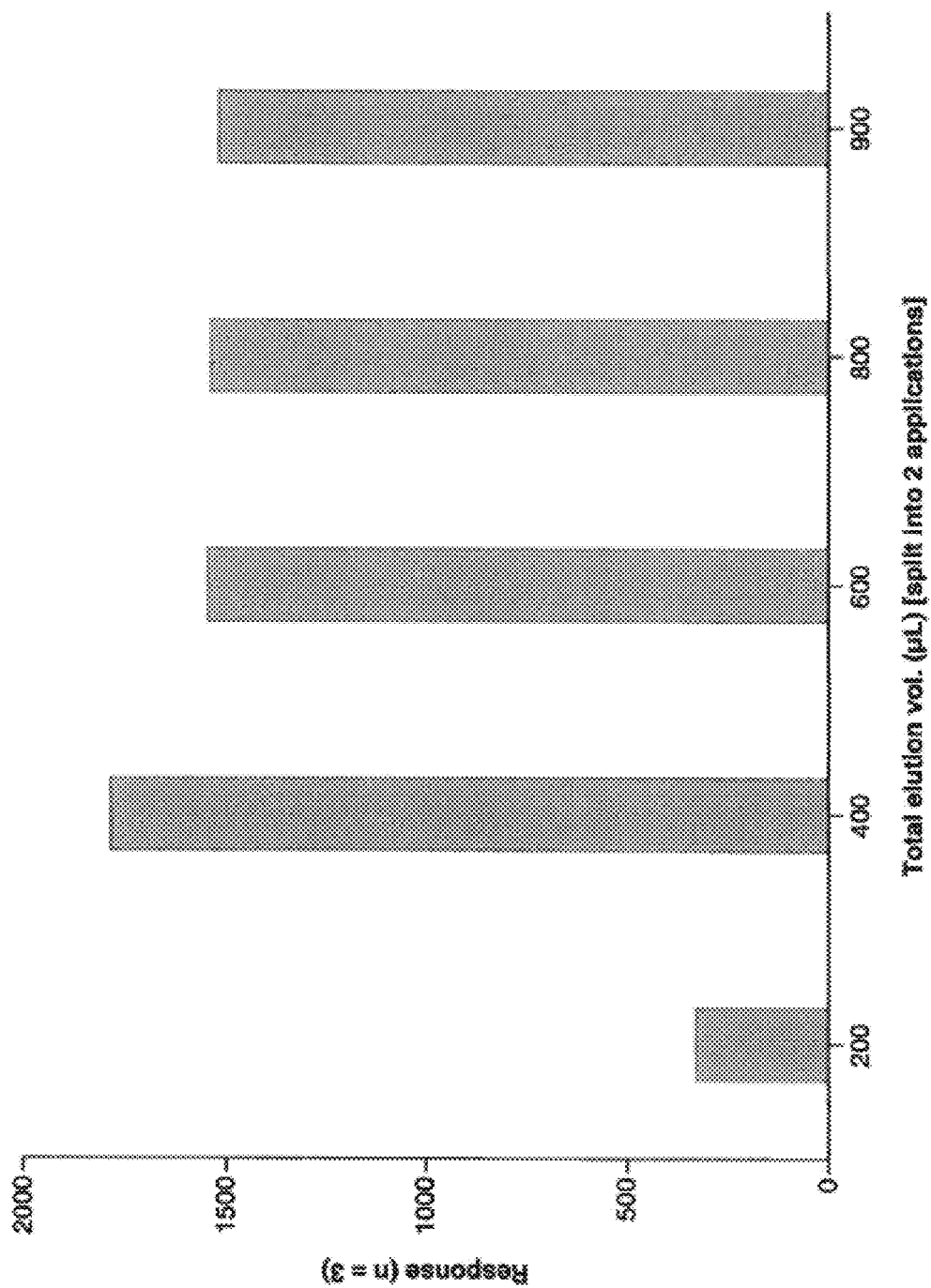
FIG. 4 depicts a bar graph of an elution volume optimization test in accordance with an embodiment of the present disclosure.

FIG. 4 depicts a bar graph of an elution volume optimization test in accordance with an embodiment of the present disclosure. A volume optimization test can aid in determining an optimal amount of eluent to use during an extraction such that the compound of interest is not diluted beyond a detection threshold for mass spectrometry analysis. Conversely, a minimal amount of volume may be useful for providing enough of a sample volume to be injected and analyzed by the mass spectrometer. Thus, providing a challenge in determining a concentration-to-volume ratio. Following the washing of the compound of interest on the sorbent bed during the extraction step, an elution step using 2.0% ammonium hydroxide in 3:7, v:v, acetonitrile:water ensured that the oligonucleotide, GNV705 AS, was fully solubilized to be eluted onto the 96-well collection plate. Initially, an elution volume of 200 μl provided an insufficient amount volume to provide a useful response by mass spectrometry. It can be seen in FIG. 4 that an adjusted elution volume of 400 μl to 900 μl provided an optimal response. In one example, 800 μl of eluent (2.0% ammonium hydroxide in 3:7, v:v, acetonitrile:water) was used to provide optimal results. In other embodiments of the present disclosure, volumes greater than 900 μl may be used to elute the compound of interest from the sorbent bed. Conversely, volumes lesser than 200 μl may also be used to elute the compound of interest from the sorbent bed.

Various embodiments of the disclosure have been described herein. It should be recognized that these embodiments are merely illustrative of the present disclosure. Variations of those preferred embodiments may become apparent to those of ordinary skill in the art upon reading the foregoing description. It is expected that skilled artisans can employ such variations as appropriate, and the disclosure is intended to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated or otherwise clearly contradicted by context.

EXAMPLES

Example 1

HILIC and HPE Method Development

Chemicals & Materials

The reference material for the analyte GNV705 AS, also the N-1 and N-2 metabolite reference materials, was kindly gifted from Genevant Sciences (MA, USA). The method was to be quantitatively optimized only for the single-stranded antisense, not the duplex. The candidate internal standard (IS) reference material, a structural analog, was obtained from Integrated DNA Technologies (IL, USA). Acetonitrile, concentrated phosphoric acid (85%), concentrated ammonium hydroxide (25%), concentrated formic acid and ammonium formate were all obtained from Sigma Aldrich and were LC-MS grade with the exception of phosphoric acid, which was ACS grade. Water was purified in-house with a ThermoScientific Barnstead Nanopure purification system by reverse-osmosis filtration and subsequent deionization to a resistivity of 18.2 MΩ cm. Control cynomolgus plasma with $K_2$EDTA anticoagulant was obtained from BioIVT (NY, USA), including from six individual donors for the differential tests and selectivity.

Calibration Standards & Quality Control Samples

The GNV705 AS primary solution and a candidate IS were prepared at 100 μM in 9:1 v:v water:acetonitrile. Calibration and quality control (QC) sample spiking solutions, and the IS spiking solution, were prepared in 9:1 v:v water:acetonitrile, in polypropylene tubes. Plasma was prepared in analogous polypropylene tubes at concentrations of 0.5, 2, 5, 10, 20, 50, 100, 200, 500, 1000 and 2000 nM for calibrant samples and at 0.5, 2, 5, 10, 20, 100 and 2000 nM for QC samples. Many of these nominal levels are the same between the calibrants and QCs, and this was deemed as not impactful to the integrity of the results. Volumes of spiking solution were no more than 2% of the volume of plasma spiked. Blank hemolytic plasma was prepared for spiking by adding previously flash-frozen whole human blood to regular blank cynomolgus plasma with $K_2$EDTA from the main stock, to a resultant hemolytic level of 2%.

Method Development & Performance Assessment

There were three predominant phases of the method development that were of paramount interest for some embodiments of the invention. Attaining linearity in the solution domain using the appropriate HILIC-selected reaction monitoring (SRM) conditions, the extraction from matrix, and the detector format evaluation and comparison.

The chromatography was readily established as very similar to the previous reported work [MacNeill et al., Bioanalysis 11: 1155-67 (2019)] but upon injection of complete calibration curves in solution at representative concentrations for plasma extracts, it became clear that unusual curvature was manifesting whereby the slope increased with nominal concentration. The associated experiments to subsequently produce and confirm linearity were performed in both nominal mass and accurate mass detection and involved two key parameters. The first was investigating linearity or otherwise from injections of solutions of varying compositions of acetonitrile and (0.05% ammonium hydroxide in 10 mM ammonium formate [aq]). The second lay in the choice of what and how many readily detectable charge states to use in the quantification. Available were the most abundant 4-charge state at m/z 1832, the 5-charge state at m/z 1465 and the 6-charge state at m/z 1221.

Toward the end of method development, having focused on the silica base as part of the essence of the new selectivity avenue in terms of the extraction, key SPE experiments were conducted investigating how elution volume related to extraction recovery, and then how the extent of plasma dilution prior to loading would affect recovery. The former experiment used the following total elution volumes, where each was split into two applications: 200, 400, 600, 800 and 900 μl. The latter experiment used the following added volumes of 6% phosphoric acid (aq): 200, 400, 600, 700 and 800 μl.

A large part of the ultimate objective was to demonstrate rugged quantitative performance of the complete method developed for GNV705 AS, and this was demonstrated with a series of analytical batches involving primarily accurate mass detection for inter- and intraday analysis. There was a direct comparison of nominal mass detection with accurate mass detection in terms of one intraday analysis for nominal mass detection, a batch later reinjected as one of the interday analyses for accurate mass. The method validation-style assessment otherwise included bread and butter experiments in the GLP validation domain, with the establishment of recovery, selectivity, matrix factor, differential matrix effect and hemolytic effect determination all duly performed. Stability was not directly investigated but had been characterized prior by separate means.

Establishing Linearity

In the solution domain, prior to the extraction work, the tests using nominal mass detection had initially involved the most abundant precursor ions with a view to summation for the final total peak area-based integration for the highest sensitivity quantification. This premise is generally aligned with biologics quantification using LC-MS. However, it was observed that curvilinear regression was occurring, curvature of such a nature that response was increasing with nominal concentration. Knowing particularly from general oligonucleotide assay experience in-house (data not shown) that this type of curvature is usually an indicator of the phenomenon of nonspecific adsorption to vessel surfaces, that this could be occurring was surprising. This is on the basis of previous oligonucleotide work with the same kind of polypropylene vessels and solvent compositions, with the unpaired oligonucleotides in all their unreserved polarity having negligible affinity for the hydrophobic surface presented by the polypropylene.

Ultimately, it was demonstrated that adjusting the injected solvent composition to increase oligonucleotide solubility therein, by increasing the aqueous content, was only a minor part of the solution to the curvature. This could be brought to 60% aqueous from 45% aqueous without compromising the chromatography. The major factor lay in the monitoring scheme within the acquisition method. In a departure from the normal expectation for biologics, it was found that including only the one precursor from the SRM, the most abundant 4-charge state at m/z 1832, was a direct road to far better linearity. Hence, two other mass spectrally visible charge states were omitted, the 5-charge state at m/z 1465 and the 6-charge state at m/z 1221. The various product ions listed of this one precursor could still be summed in the quantification. The product-moment correlation coefficients for the varied conditions are indicative of the improvement. With all charge states monitored in conjunction with only 45% aqueous in the injection composition, the coefficient was 0.836. With the same aqueous composition and moving to only the one key charge state precursor ion, the correlation jumped to 0.980. With the final touch of moving to 60% aqueous and involving the one key charge state, the correlation coefficient was 0.997.

The conditions were entirely reproduced on accurate mass detection. The conditions held firm upon translation to matrix extracts using the 60% aqueous reconstitution solution. Additionally, the curvature initially observed with multiple precursor ions involved was also confirmed as manifest with accurate mass detection.

Optimized Sample Preparation

The SPE of GNV705 AS from cynomolgus plasma was performed as follows. The SPE sorbent was United Chemical Technology (PA, USA) NAX, 100 mg, an aminopropyl phase on a silica base, in 96-well format. The 96-well 1 ml round-bottom collection plates to receive the final eluent were regular DNA LoBind polypropylene from Eppendorf (Hamburg, Germany). Each step where liquid was applied was allowed to pass through gravity alone. The time taken was 3-4 min for this to occur, corresponding to an adequately slow linear flow velocity conducive to best performance under the circumstances of high-energy ionic interactions being formed and broken.

The candidate internal standard (IS), in 1:9 v:v acetonitrile:water at 2500 nM, was added in 20 µl aliquots to 100 µl plasma within 1.5 ml regular polypropylene tubes. This resulted in an IS concentration of 500 nM in matrix. Then, a two-second vortex of each tube took place. This was followed by the addition of 700 µl 6% $H_3PO_4$ (aq) to each sample and another vortex step. Sorbent conditioning involved the application of 1 ml 9:1 v:v acetonitrile:2% formic acid (aq), and there was no subsequent equilibration step prior to loading the diluted plasma sample. The prepared samples (800 µl) were loaded onto the conditioned sorbent beds and this was followed by the application of a 1 ml wash with 9:1 v:v acetonitrile:2% formic acid (aq). The next wash was with 1 ml 8:2 v:v acetonitrile:2% ammonium hydroxide (aq). Analyte elution was effected by the application of 2×400 µl 70:30:2 v:v:v water:acetonitrile:c. ammonium hydroxide into the 1 ml round-well 96-well collection plate, where the pH of the aqueous component of the mixture is 11.5. Finally, the eluates were evaporated under oxygen-free nitrogen at 40° C., then reconstituted in 200 µl 4:6 v:v acetonitrile:0.05% ammonium hydroxide in 10 mM ammonium formate (aq). The block was then sealed, put on a plate shaker at 500 rpm for 10 min before being placed in the autosampler compartment at 10° C. awaiting injection.

Optimized LC-MS Analysis for Research-Based Method Development

The analytical column for GNV705 AS quantification was a Waters (MA, USA) Acquity PREMIER UPLC BEH Amide with dimensions of 2.1×50 mm and 1.7 µm particle diameter. The LC-MS front end was a classic Waters Acquity UPLC system that included pump, degasser, autosampler, column heater and mobile-phase preheater. The autosampler compartment was maintained at 10° C. Gradient elution was employed, with mobile-phase components of 0.05% ammonium hydroxide in 10 mM ammonium formate (aq) and acetonitrile, delivered at 0.45 ml/min and with mobile and stationary phases both at 40° C. For each gradient cycle, initially the mobile-phase composition began at 20% aqueous, and the mobile-phase composition underwent a linear excursion over the next 5.0 min to 50% aqueous. This composition was held for 0.5 min, then re-equilibration took place over the remaining 1.0 min of the 6.5-min overall run time. The injection volume was 6.0 µl and partial loop with needle overfill mode was used, along with a strong wash composition of 0.05% ammonium hydroxide in 10 mM ammonium formate (aq) and a weak wash composition of 1:1 v:v acetonitrile:0.05% ammonium hydroxide in 10 mM ammonium formate (aq).

Nominal Mass Detection

The triple-quadrupole mass spectrometer was a Sciex (Concord, ON, Canada) 6500+ with Turbo Ionspray source conditions and auxiliary gas heated to 550° C. On the IonDrive source, the probe positioning was 0 mm in the vertical and 7 mm in the horizontal. The instrument was operated in high mass mode. There was no split of the LC flow into the ion source.

In negative-ion SRM mode, the transitions used were 1832.4→586.1, 1832.4→664.1 and 1832.4→604.1 for GNV705 AS, where all values denote m/z. The precursor ion involved corresponds to the charge state of $[M-4H]^{4-}$. These peaks were selected on the basis of most compelling intensity and verifiability. The peak area-based integration for the quantitative end point involved the summation of the peaks acquired in each transition.

Accurate Mass Detection

The high-resolution mass spectrometer was a Sciex ZenoTOF 7600 System with Optiflow ion source and auxiliary gas heated to 550° C. with no split of the LC flow into the source. A negative $MRM^{HR}$ acquisition with Zenotrap pulsing was applied for quantification, where the precursor ion m/z target was set as 1832.3 and an MS/MS scan range was 100-2000 m/z. The simultaneously-acquired TOF-MS data were quickly seen to give almost tenfold less response than $MRM^{HR}$ acquisition with Zenotrap pulsing. Thus, for GNV705 AS, the extracted ion chromatograms of transitions 1832→586.1134, 1832→664.0810 and 1832→604.1199, where all values denote m/z, were generated using Sciex OS software with the extraction window width set at 0.02 Da. The precursor ion involved was the same as for nominal mass, corresponding to the charge state of $[M-4H]^{4-}$. The selected product ions were analogous to the nominal mass scheme. Again, these peaks were selected on the basis of most compelling intensity and verifiability. For the IS, the extracted ion chromatograms were 1670→586.1275, 1670→664.0609 and 1670→604.1013 with the same extraction window width. The peak area-based integration for the quantitative end point involved the summation of the peaks in each transition.

HILIC Method Development

The concentration of ammonium hydroxide in the aqueous component of the mobile phase was increased from 0.02 to 0.05% and the gradient manifested over 5.0 minutes with a 0.45 ml/min flow rate. These make it altogether more eluotropic, necessary for effecting timely elution of the RNA oligonucleotides, which are more polar, hence, more strongly retained that DNA oligonucleotides via mainly the extra hydroxylation on the ribose unit.

Figure 2:
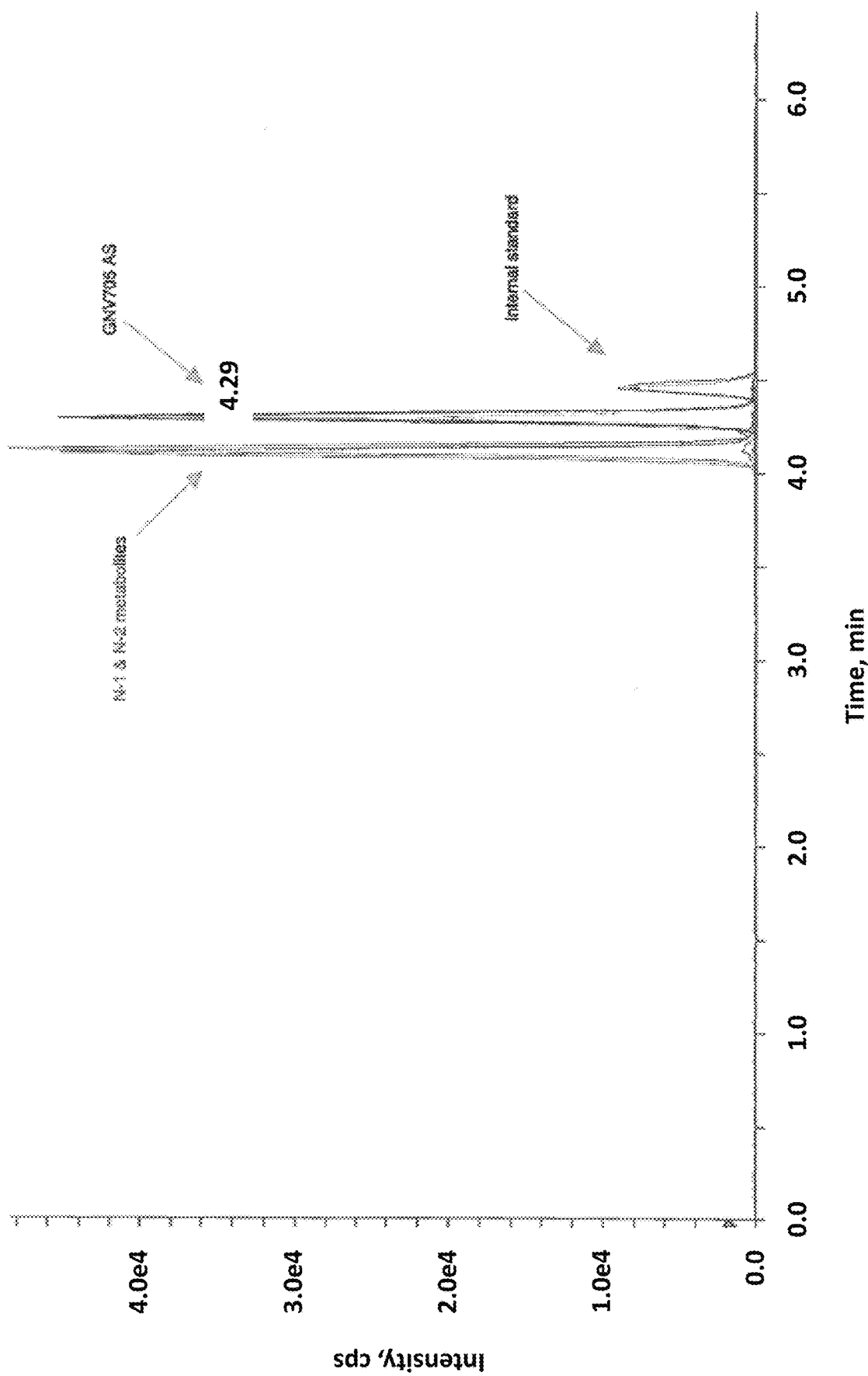
FIG. 2 depicts a hydrophilic-interaction liquid chromatography chromatograph displaying the resolution of analyte GNV705 AS (middle, 4.29 min) from the earlier eluting N-1 and N-2 metabolites (both 4.1 min) and the later eluting candidate internal standard (4.4 min) in accordance with an embodiment of the present disclosure.

FIG. 2 depicts a representative chromatogram, which illustrates the resolving power at hand. This was a 5-ul injection of a 200 nM mixture in solution on the nominal mass detector. The N-1 and N-2 metabolites, first-eluting and largely coeluting with each other, are baseline resolved from GNV705 AS, eluting immediately after. The candidate internal standard, eluting last, is in turn baseline resolved from GNV705 AS.

Hydrophilic-Phase Extraction Method Development

The first attempts using a 100-mg bed weight of UCT NAX, an aminopropyl-bonded phase, from United Chemical Technologies brought higher recoveries than previously seen. From then, a series of tests allowed full optimization of the procedure.

For the 100-mg packed sorbent, a procedure prior to elution and the sample load notwithstanding, based on 1-ml solvent application was appropriate. In all steps, a minimum 10% aqueous was maintained in order to preserve HILIC conditions and avoid oligonucleotide precipitation that may lead to imprecision. In an unusual and interesting discovery, it was found that omitting the high-aqueous equilibration step, as would be intuitive in almost all SPE procedures, was found to be beneficial to recovery in this process. This is postulated to be an artifact of the retained oligonucleotide band being so hydrophilic as to be repelled from a surrounding organic environment as would be present after the conditioning step, thereby not broadening as it otherwise would after a high-aqueous step, and avoiding associated recovery loss. Similarly, an initial fully aqueous wash step was applied, to avoid breakthrough in the highly aqueous conditions that fully solubilize nucleic acids such as the analyte.

The single condition was therefore 1 ml of 9:1 v:v acetonitrile:2% formic acid (aq), with the acidity maintaining the ionized state of the key ionic moiety of the bonded phase. The wash after the sample load was identical to the condition, again the high 'oligo-phobic' organic helping to prevent analyte breakthrough. For the plasma sample dilution and loading, initially it was decided to use 6% phosphoric acid (aq) as the diluent, a little more concentrated than had previously been used in work to better align with the low plateau of pH attained by phosphoric with increasing concentration. This does appear to make a difference for these first few moments, while the high-energy electrostatic bonds are forming, albeit involving a little more neutralization of the phosphate backbone and accordingly more nonpolar interactions, low energy, thus rapidly manifesting, a phenomenon synonymous with success at this stage of classical mixed-mode SPE. A brief test showed around 25% better recovery in going from 4 to 6% phosphoric acid in the otherwise established conditions. FIG. 3 shows the data from a test where the 100-µl plasma volume was diluted to different extents prior to loading, as in at least one separate oligonucleotide client-related application a dependency in recovery was established (data not shown) in the sense of recovery increasing with total volume (plasma and diluent) applied until reaching a maximum. The reasoning is speculated to be to do with maximizing opportunity for capture by spacing out volumetrically the species to be retained, under preferably a flow that is as slow as is practically reasonable, as it is as mentioned, high-energy electrostatic bonding that needs to manifest. Gravity alone gave suitable flow for this work, with the packing of the wells allowing flow at each step that came to 4 min at the most. With regard to the outcome of the test, as shown in FIG. 3, any such dependency did not seem overwhelming for GNV705 AS but was more apparent for the IS, showing a quite definitive signal increase backed up by triplicate analysis. The highest value of 800 µl appeared optimal for safety and practicality.

As mentioned, the first wash was identical to the single-step condition, 1 ml of 9:1 v:v acetonitrile:2% formic acid (aq). Through this it was noted that there was never restriction of flow through the sorbent, indicating no precipitates of proteins present, largely confirming their elimination after denaturation in the sample dilution and passing right through in the sample load, unable to access the pores in the packed material. The following wash immediately prior to elution was with 1 ml 8:2 v:v acetonitrile:2% ammonium hydroxide (aq). This introduced a little eluotropicity by increasing in aqueous content and featuring a slightly alkaline pH, without enough concentration to neutralize the key ionic moiety in the bonded phase, so retention persisted. Then, the elution was applied, with 2% ammonium hydroxide in (3:7 acetonitrile:water), highly aqueous to fully solubilize the analyte and sufficiently alkaline to neutralize the sorbent, and the results of the final elution volume optimization are shown in FIG. 4. For the 100-mg packed bed, a void volume of 150 µl was anticipated, and therefore a test with 200-µl total volume was included. As can be seen in FIG. 4, this was not enough to effect full elution. Only once 2-3 void volumes have passed, a total 400 µl, was the full response corresponding to the elution of what remains on-cartridge observed. To err on the side of caution, with knowledge of how incurred samples can differ quite profoundly in their natural matrix compositions, the final elution volume was established at 800 µl total to afford sufficient eluting power in unusual conditions that may demand it. Particularly since, as can be seen in FIG. 4, the area between 600 and 900 µl showed no difference in recovery indication.

Decisively, in all the available numerical detail over the low QC (LQC) and high QC (HQC) nominal levels (20 and 2000 nM), the recovery for GNV705 AS is above 60% and the candidate IS in the same region as calculated over the replicate set at the associated one nominal level. The final HPE schematic is shown in FIG. 1. With the roots of the retention mechanism embedded in polar interactions akin to HILIC, the moniker of "hydrophilic-phase extraction" (HPE) was assigned to the new scheme.

It may be perceived, on the surface, that a marriage of a HILIC-based sample extraction with a HILIC LC-MS analytical end point may not result in clear orthogonality of selectivity between these two methodological components. However, this ever-desirable feature may actually be largely preserved because of the details in each case. Primarily, the chemistry of the stationary support is different between the analytical column and the solid-phase packed cartridges, amide on hybrid polymer-silica compared with aminopropyl on silica. Then, the extraction uses a comprehensive wash scheme involving both acidic and alkaline applications prior to elution, which will have a large bearing on selectivity and the elimination or resolution of interferences.

Example 2

Examples of Certain Embodiments

Listed herein are non-limiting examples of certain embodiments of the technology.

A1. A method for determining an amount and/or presence of a compound of interest in a sample from a subject comprising the steps of:
  providing a sample believed to contain the compound of interest;
  conducting an extraction of the compound of interest, wherein the extraction is a hydrophilic-phase extraction;
  isolating the compound of interest from other components of the sample via liquid chromatography; and
  analyzing the compound of interest via a mass spectrometer.

A2. The method of embodiment A1, wherein the sample is a biological sample.

A3. The method of embodiment A2, wherein the biological sample is plasma.

A4. The method of embodiment A3, wherein the compound of interest is an RNA or DNA oligonucleotide.

A5. The method of embodiment A4, wherein the RNA or DNA oligonucleotide is a therapeutic oligonucleotide.

A6. The method of embodiment A1, wherein the hydrophilic-phase extraction is conducted on a sorbent bed comprising an aminopropyl phase on a silica base.

A7. The method of embodiment A6, wherein conducting the hydrophilic-phase extraction comprises:
- adding aqueous acid and an internal standard to the sample;
- conditioning the sorbent bed with a first volume of 9:1 v:v acetonitrile:2.0% formic acid;
- loading the sample onto the sorbent bed;
- washing the sorbent bed with a second volume of 9:1 v:v acetonitrile: 2.0% aqueous formic acid;
- washing the sorbent bed with a third volume of 8:2 v:v acetonitrile:2.0% ammonium hydroxide; and
- eluting the compound of interest onto a collection plate by applying two consecutive volumes of 2% ammonium hydroxide in 70:30 v:v water:acetonitrile.

A8. The method of embodiment A1, wherein isolating the compound of interest comprises:
- employing an ethylene-bridged hybrid, amide-phase column for isolating the compound of interest;
- employing an aqueous-organic mobile-phase comprising both 0.05% ammonium hydroxide in 10 mM ammonium formate and acetonitrile; and
- employing a gradient ranging from 20% aqueous to 50% aqueous over a period of five minutes.

A9. The method of embodiment A1, wherein analyzing the compound of interest comprises ionizing the compound of interest by the mass spectrometer and monitoring fragmented ions in negative-ion mode.

A10. The method of embodiment A1, wherein analyzing the compound of interest by the mass spectrometer is performed by both a low-resolution mass spectrometer and a high-resolution mass spectrometer.

A11. The method of embodiment A1, wherein the method is conducted under ion-pairing-free conditions.

B1. A system for determining an amount and/or a presence of a compound of interest in a sample from a subject comprising:
- a solid-phase extraction system;
- a liquid chromatography system; and
- a mass spectrometer system.

B2. The system of embodiment B1, wherein the sample is a biological sample.

B3. The system of embodiment B1, wherein the biological sample is plasma.

B4. The system of embodiment B1, wherein the compound of interest is an RNA or DNA oligonucleotide.

B5. The system of embodiment B4, wherein the RNA or DNA oligonucleotide is a therapeutic oligonucleotide.

B6. The system of embodiment B1, wherein the solid-phase extraction system is a hydrophilic-phase extraction system, and wherein the hydrophilic-phase extraction system comprises a modified sorbent bed comprising an aminopropyl phase on a silica base.

B7. The system of embodiment B1, wherein the system comprises ion-pairing-free reagents.

B8. The system of embodiment B7, wherein the mass spectrometer system is a low-resolution or a high-resolution mass spectrometer.

C1. A computer-program product which, when executed on one or more data processors, causes one or more data processors to perform actions to direct at least one of the steps of:
- providing a sample containing a compound of interest;
- conducting a solid-phase extraction of the compound of interest;
- isolating the compound of interest from other components of the sample via liquid chromatography; and
- analyzing the compound of interest via a mass spectrometer.

What is claimed is:

1. A method for determining an amount and/or presence of a compound of interest in a sample from a subject comprising the steps of:
    providing a sample believed to contain the compound of interest, wherein the sample is a biological sample, and wherein the compound of interest is an RNA or a DNA oligonucleotide;
    conducting an extraction of the compound of interest, wherein the extraction is a hydrophilic-phase extraction conducted on a sorbent bed comprising an aminopropyl phase on a silica base, and wherein conducting the hydrophilic-phase extraction comprises
      (a) adding an aqueous acid and an internal standard to the sample;
      (b) conditioning the sorbent bed with a solution comprising 9:1 v:v acetonitrile: 2.0% formic acid;
      (c) loading the sample onto the sorbent bed;
      (d) washing the sorbent bed; and
      (e) eluting the compound of interest with a solution comprising ammonium hydroxide and acetonitrile;
    isolating the compound of interest from other components of the sample via liquid chromatography; and
    analyzing the compound of interest via a mass spectrometer.

2. The method of claim 1, wherein the biological sample is plasma.

3. The method of claim 1, wherein the RNA or DNA oligonucleotide is a therapeutic oligonucleotide.

4. The method of claim 1, wherein isolating the compound of interest comprises:
    employing an ethylene-bridged hybrid, amide-phase column for isolating the compound of interest;
    employing an aqueous-organic mobile-phase comprising both 0.05% ammonium hydroxide in 10 mM ammonium formate and acetonitrile; and
    employing a gradient ranging from 20% aqueous to 50% aqueous over a period of five minutes.

5. The method of claim 1, wherein analyzing the compound of interest comprises ionizing the compound of interest by the mass spectrometer and monitoring fragmented ions in negative-ion mode.

6. The method of claim 1, wherein analyzing the compound of interest by the mass spectrometer is performed by both a low-resolution mass spectrometer and a high-resolution mass spectrometer.

7. The method of claim 1, wherein the method is conducted under ion-pairing-free conditions.

8. The method of claim 1, wherein (d) comprises a first washing step comprising washing the sorbent bed with a solution comprising acetonitrile and formic acid.

9. The method of claim 8, wherein the first washing step comprises washing the sorbent bed with a solution comprising 9:1 v:v acetonitrile: 2.0% formic acid.

10. The method of claim 8, wherein (d) further comprises a second washing step comprising washing the sorbent bed with a solution comprising acetonitrile and ammonium hydroxide.

11. The method of claim 10, wherein the second washing step comprises washing the sorbent bed with a solution comprising 8:2 v:v acetonitrile: 2.0% ammonium hydroxide.

12. The method of claim 1, wherein the eluting step comprises eluting the compound of interest onto a collection plate by applying two consecutive volumes of the solution comprising ammonium hydroxide and acetonitrile.

13. The method of claim 1, wherein the eluting step comprises eluting the compound of interest onto a collection plate by applying two consecutive volumes of 2% ammonium hydroxide in 70:30 v:v water:acetonitrile.

14. A system for determining an amount and/or a presence of a compound of interest in a sample from a subject comprising:
- a hydrophilic-phase extraction system comprising a sorbent bed comprising an aminopropyl phase on a silica base and components for
  - (a) adding an aqueous acid and an internal standard to the sample, wherein the sample is a biological sample;
  - (b) conditioning the sorbent bed with a solution comprising 9:1 v:v acetonitrile: 2.0% formic acid;
  - (c) loading the sample onto the sorbent bed;
  - (d) washing the sorbent bed; and
  - (e) eluting the compound of interest with a solution comprising ammonium hydroxide and acetonitrile,
  - wherein the compound of interest is an RNA or a DNA oligonucleotide;
- a liquid chromatography system; and
- a mass spectrometer system.

15. The system of claim 14, wherein the biological sample is plasma.

16. The system of claim 14, wherein the RNA or DNA oligonucleotide is a therapeutic oligonucleotide.

17. The system of claim 14, wherein the system comprises ion-pairing-free reagents.

18. The system of claim 17, wherein the mass spectrometer system is a low-resolution or a high-resolution mass spectrometer.

19. A tangible, non-transitory computer readable medium storing a computer-program product which, when executed on one or more data processors, causes one or more data processors to perform actions to direct at least one of the steps of:
- providing a sample containing a compound of interest, wherein the sample is a biological sample, and wherein the compound of interest is an RNA or a DNA oligonucleotide;
- conducting a solid-phase extraction of the compound of interest from the sample, wherein the extraction is a hydrophilic-phase extraction conducted on a sorbent bed comprising an aminopropyl phase on a silica base, and wherein conducting the hydrophilic-phase extraction comprises
  - (a) adding aqueous acid and an internal standard to the sample;
  - (b) conditioning the sorbent bed with a solution comprising 9:1 v:v acetonitrile: 2.0% formic acid;
  - (c) loading the sample onto the sorbent bed;
  - (d) washing the sorbent bed; and
  - (e) eluting the compound of interest with a solution comprising ammonium hydroxide and acetonitrile;
- isolating the compound of interest from other components of the sample via liquid chromatography; and
- analyzing the compound of interest via a mass spectrometer.

* * * * *